United States Patent
Higashide et al.

(10) Patent No.: US 11,756,430 B2
(45) Date of Patent: Sep. 12, 2023

(54) SYSTEM FOR ANALYZING BOARDING STATUS OF PASSENGERS AT A VEHICLE STOP

(71) Applicant: TOYOTA JIDOSHA KABUSHIKI KAISHA, Toyota (JP)

(72) Inventors: Hiroshi Higashide, Nagoya (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/490,021

(22) Filed: Sep. 30, 2021

(65) Prior Publication Data

US 2022/0108616 A1   Apr. 7, 2022

(30) Foreign Application Priority Data

Oct. 1, 2020   (JP) .................................. 2020-167305

(51) Int. Cl.
*G08B 21/00* (2006.01)
*G08G 1/00* (2006.01)
*H04W 4/46* (2018.01)

(52) U.S. Cl.
CPC ............. *G08G 1/205* (2013.01); *G08G 1/202* (2013.01); *H04W 4/46* (2018.02)

(58) Field of Classification Search
CPC ......... G08G 1/205; G08G 1/202; H04W 4/46; H04W 4/42; G06Q 10/04; G06Q 10/0631; G06Q 50/30
USPC ........................................................ 340/988
See application file for complete search history.

(56) References Cited

U.S. PATENT DOCUMENTS

| | | | | |
|---|---|---|---|---|
| 4,791,571 A | * | 12/1988 | Takahashi | G08G 1/127 340/910 |
| 6,681,174 B1 | * | 1/2004 | Harvey | G08G 1/127 340/433 |
| 2006/0074545 A1 | * | 4/2006 | Kim | G08G 1/123 340/994 |
| 2011/0221615 A1 | * | 9/2011 | Chiu | H04W 4/029 340/988 |
| 2013/0127616 A1 | * | 5/2013 | Robitaille | G08C 17/02 340/539.13 |

(Continued)

FOREIGN PATENT DOCUMENTS

| | | |
|---|---|---|
| JP | S60-100899 U | 7/1985 |
| JP | H10-20784 A | 1/1998 |

(Continued)

*Primary Examiner* — Mark S Rushing
(74) *Attorney, Agent, or Firm* — Oliff PLC

(57) ABSTRACT

An information processing apparatus encourages passengers to practice distributed boarding to enable smooth operation of vehicles. The information processing apparatus includes a controller. The controller is configured to acquire information indicating a boarding status of passengers at a stop when it is judged that a preceding vehicle has arrived at the stop, generate notification information to encourage passengers who have not boarded the preceding vehicle to practice distributed boarding onto a subsequent vehicle when it is judged that the boarding status satisfies a predetermined condition based on the acquired information, and provide the generated notification information to the preceding vehicle and/or the stop.

17 Claims, 6 Drawing Sheets

(56) References Cited

U.S. PATENT DOCUMENTS

2016/0048777 A1* 2/2016 Kitagawa ............. G06Q 10/025
                                                          705/6
2021/0086806 A1* 3/2021 Bergs ............... G06Q 10/06313

FOREIGN PATENT DOCUMENTS

JP          2011-227550 A     11/2011
JP          2012-234379 A     11/2012

* cited by examiner

FIG. 6

| VEHICLE | STOP | PREDETERMINED CONDITION |
|---------|------|-------------------------|
| C1 | S1 | FIRST CONDITION |
| C2 | S2 | SECOND CONDITION |
| C3 | S3 | THIRD CONDITION |
| C4 | S4 | FOURTH CONDITION | ically encourage distributed boarding onto a subsequent vehicle in accordance with the boarding status of passengers at a stop.

SYSTEM FOR ANALYZING BOARDING STATUS OF PASSENGERS AT A VEHICLE STOP

CROSS-REFERENCE TO RELATED APPLICATION

This application claims priority to Japanese Patent Application No. 2020-167305, filed on Oct. 1, 2020, the entire contents of which are incorporated herein by reference.

TECHNICAL FIELD

The present disclosure relates to an information processing apparatus, an information processing system, a program, and a vehicle.

BACKGROUND

Technology for encouraging passengers about to board a preceding vehicle to practice distributed boarding onto a subsequent vehicle is known. For example, patent literature (PTL) 1 discloses a bus operation system that can inform passengers waiting at a bus stop of the congestion status of a bus and can promote distribution of passengers to achieve smooth bus operation.

CITATION LIST

Patent Literature

PTL 1: JP 2012-234379 A

SUMMARY

However, known technology has room for improvement in terms of encouraging distributed boarding onto a subsequent vehicle more flexibly in accordance with the boarding status of passengers at a stop even if the preceding vehicle is not full.

It would be helpful to provide technology that can more flexibility encourage distributed boarding onto a subsequent vehicle in accordance with the boarding status of passengers at a stop.

An information processing apparatus according to the present disclosure is for encouraging passengers to practice distributed boarding to enable smooth operation of vehicles, the information processing apparatus including a controller configured to: acquire information indicating a boarding status of passengers at a stop when it is judged that a preceding vehicle has arrived at the stop, generate notification information to encourage passengers who have not boarded the preceding vehicle to practice distributed boarding onto a subsequent vehicle when it is judged that the boarding status satisfies a predetermined condition based on the acquired information, and provide the generated notification information to the preceding vehicle and/or the stop.

A program according to an embodiment of the present disclosure is configured to cause an information processing apparatus, for encouraging passengers to practice distributed boarding to enable smooth operation of vehicles, to execute operations including:
judging whether a preceding vehicle has arrived at a stop;
acquiring information indicating a boarding status of passengers at the stop when it is judged that the preceding vehicle has arrived at the stop;
generating notification information to encourage passengers who have not boarded the preceding vehicle to practice distributed boarding onto a subsequent vehicle when it is judged that the boarding status satisfies a predetermined condition based on the acquired information; and
providing the generated notification information to the preceding vehicle and/or the stop.

A vehicle according to an embodiment of the present disclosure is a vehicle for encouraging passengers to practice distributed boarding to enable smooth operation of vehicles, the vehicle including a controller configured to:
acquire information indicating a boarding status of passengers at a stop when it is judged that the vehicle has arrived at the stop and provide, via the vehicle and/or the stop, a notification to encourage passengers who have not boarded the vehicle to practice distributed boarding onto a subsequent vehicle when it is judged that the boarding status satisfies a predetermined condition based on the acquired information.

The information processing apparatus, the information processing system, the program, and the vehicle according to an embodiment of the present disclosure can more flexibility encourage distributed boarding onto a subsequent vehicle in accordance with the boarding status of passengers at a stop.

BRIEF DESCRIPTION OF THE DRAWINGS

In the accompanying drawings:

FIG. 6 is a diagram for illustrating an example of processing by a controller of the information processing apparatus of FIG. 2.

DETAILED DESCRIPTION

Embodiments of the present disclosure are described below with reference to the drawings.

Figure 1:
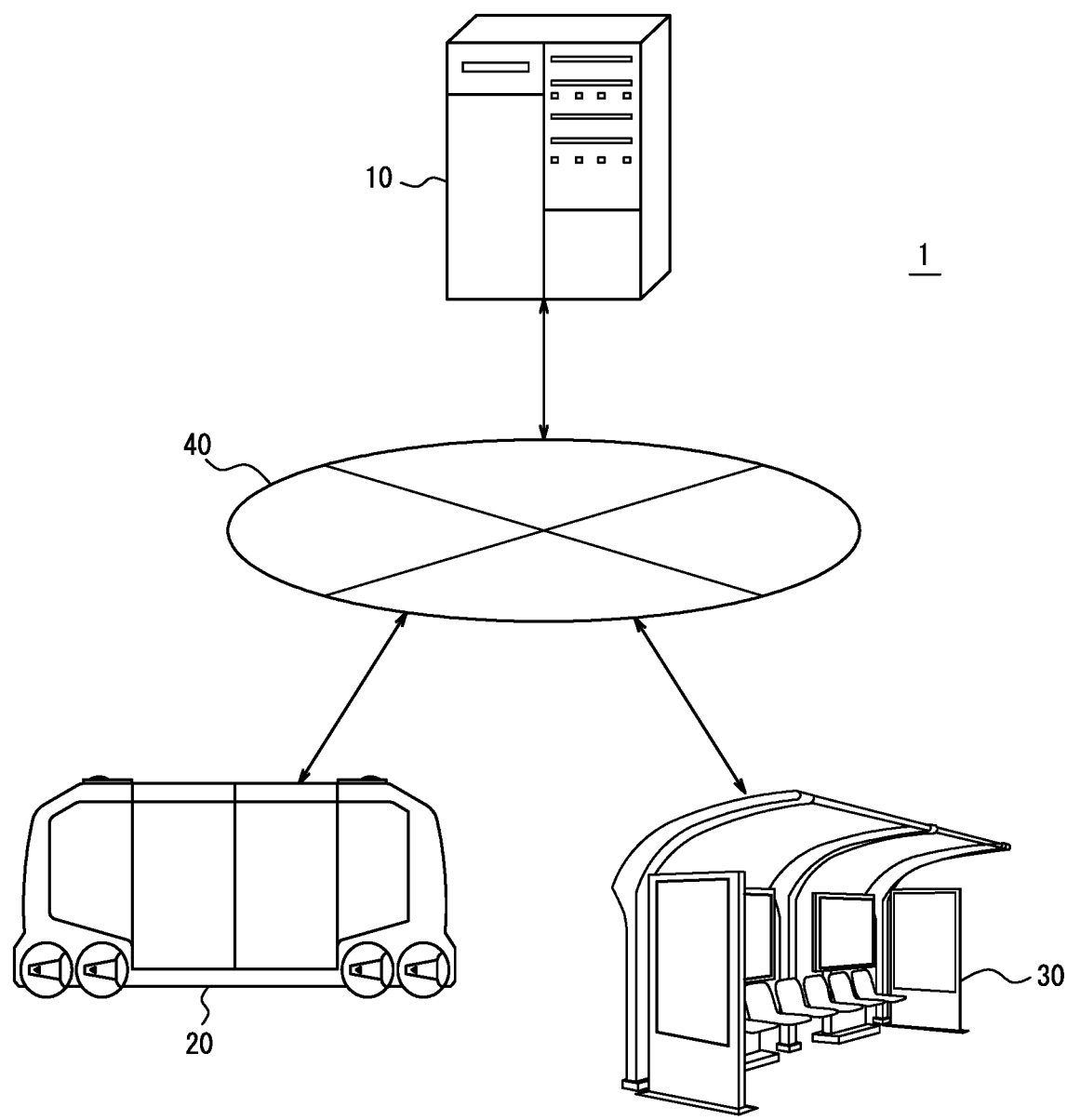
FIG. 1 is a configuration diagram illustrating a configuration of an information processing system that includes an information processing apparatus according to an embodiment of the present disclosure.

FIG. 1 is a configuration diagram illustrating a configuration of an information processing system 1 that includes an information processing apparatus 10 according to an embodiment of the present disclosure. With reference to FIG. 1, an overview of the information processing system 1 that includes the information processing apparatus 10 according to an embodiment of the present disclosure is primarily described. In addition to the information processing apparatus 10, the information processing system 1 includes a vehicle 20 and a management apparatus 30 installed at a stop.

In FIG. 1, one each of the information processing apparatus 10, the vehicle 20, and the management apparatus 30 are illustrated for the sake of simplicity, but the number of information processing apparatuses 10, vehicles 20, and management apparatuses 30 included in the information processing system 1 may be two or more of each. For example, at least one pair of a vehicle 20 corresponding to a preceding vehicle and a vehicle 20 corresponding to a subsequent vehicle may be included as the vehicle 20. Each of the information processing apparatus 10, the vehicle 20, and the management apparatus 30 is communicably connected to a network 40 including, for example, a mobile communication network and/or the Internet.

The information processing apparatus 10 is a single server apparatus or a plurality of server apparatuses that can communicate with each other. The information processing apparatus 10 is not limited to being a server apparatus and may be any general purpose electronic device, such as a personal computer (PC) or smartphone, or may be another electronic device dedicated to the information processing system 1.

The vehicle 20 includes, for example, a bus that travels with passengers on board. The vehicle 20 may travel back and forth between two predetermined points while stopping along the way at one or more stops or may travel in one direction along a circulation route while stopping along the way at one or more stops. The vehicle 20 is not limited to this example and may include any vehicle that allows passengers to board and that makes stops.

The vehicle 20 is, for example, a vehicle that performs autonomous driving. The autonomous driving may be at any level from level 1 to level 5 as defined by the Society of Automotive Engineers (SAE), for example, but is not limited to these levels and may be defined in any appropriate way. The vehicle 20 is not limited to a vehicle that performs autonomous driving and may be any vehicle driven by a driver.

The management apparatus 30 includes, for example, an electronic device installed at a stop where the vehicle 20 stops. The management apparatus 30 manages the exchange of information for passengers waiting at the stop. For example, the management apparatus 30 executes processing such as acquisition and notification of information at the stop. As described below, the management apparatus 30 includes, for example, an imaging module configured to image the boarding status of passengers at the stop, an output interface configured to notify the passengers waiting at the stop of any appropriate information, and a control module configured to control these components. The management apparatus 30 is not limited to these examples and may be an electronic device, installed at the stop, that is dedicated for the information processing system 1.

As a summary of an embodiment, the information processing apparatus 10 encourages passengers to practice distributed boarding to enable smooth operation of the vehicle 20. When it is judged that a preceding vehicle 20 has arrived at the stop, the information processing apparatus 10 acquires information indicating the boarding status of passengers at the stop. When it is judged that the boarding status satisfies a predetermined condition based on the acquired information indicating the boarding status of the passengers, the information processing apparatus 10 generates notification information to encourage passengers who have not boarded the preceding vehicle 20 to practice distributed boarding onto a subsequent vehicle 20. The information processing apparatus 10 provides the generated notification information to the preceding vehicle 20 and/or the stop. In the present disclosure, the "predetermined condition" includes a first condition, a second condition, a third condition, and/or a fourth condition, for example.

The first condition is that the rate of decrease of passengers who have not boarded at the stop is less than a first threshold. In the present disclosure, the "rate of decrease" includes, for example, the decrease in the number of people per unit time. The first threshold may be determined in advance by, for example, an information service provider that manages the information processing system 1 or may be determined in advance by an operation management company that manages operation of the vehicle 20.

The second condition is that the number of passengers who have not boarded by a specified time before the departure time at the stop is greater than a second threshold. The specified time may be determined in advance by, for example, an information service provider that manages the information processing system 1 or may be determined in advance by an operation management company that manages operation of the vehicle 20. The second threshold may be determined in advance by, for example, an information service provider that manages the information processing system 1 or may be determined in advance by an operation management company that manages operation of the vehicle 20.

The third condition is that there is at least one passenger who has not boarded when the departure time at the stop is reached. The fourth condition is that the number of passengers having a predetermined attribute among the passengers who have not boarded at the stop is greater than a third threshold. In the present disclosure, the "predetermined attribute" includes, for example, elderly, young, disabled, or the like. The third threshold may be determined in advance by, for example, an information service provider that manages the information processing system 1 or may be determined in advance by an operation management company that manages operation of the vehicle 20.

Figure 2:
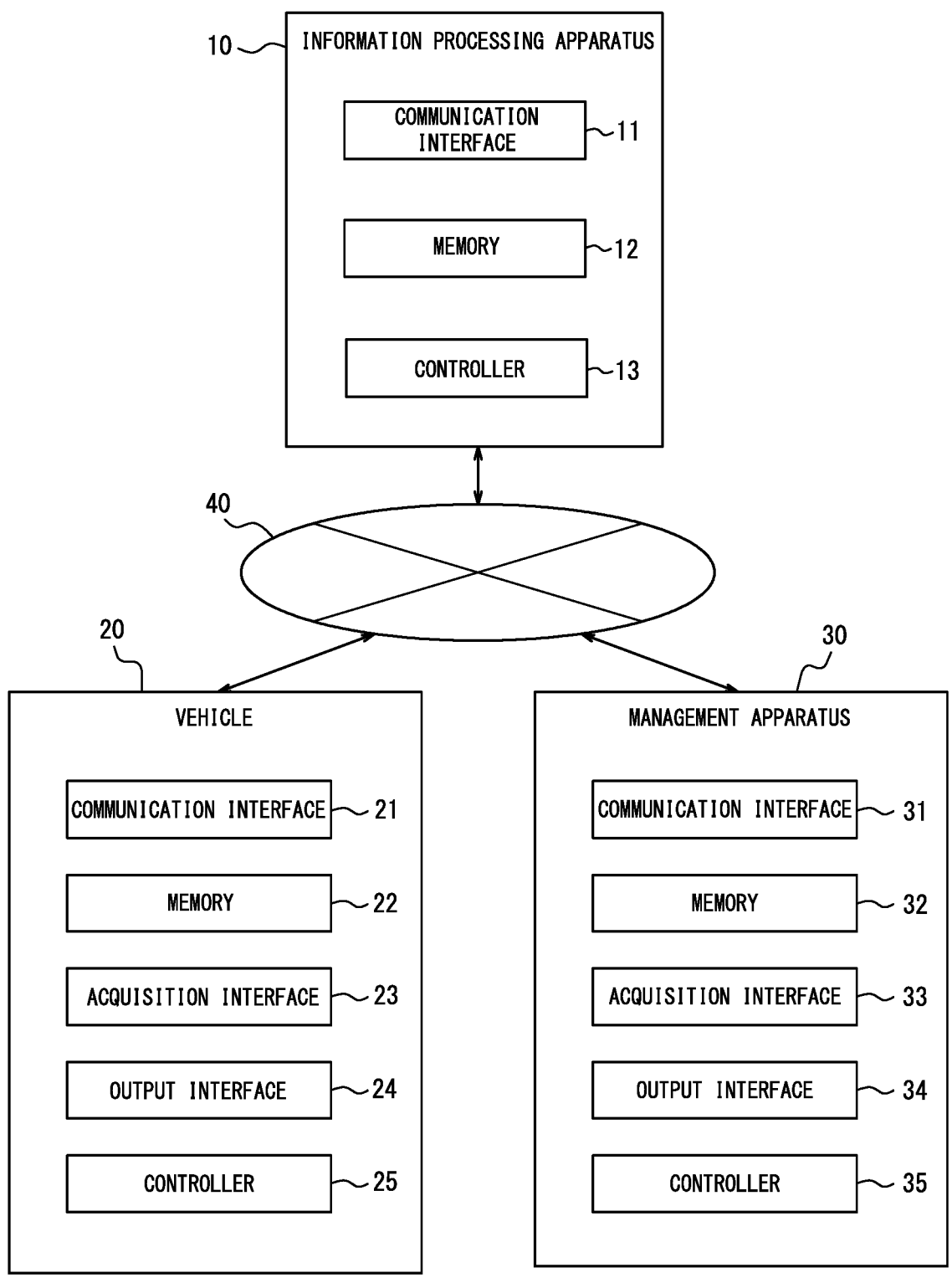
FIG. 2 is a functional block diagram illustrating schematic configurations of the information processing apparatus, a vehicle, and a management apparatus of FIG. 1.

Next, with reference to FIG. 2, configurations of the information processing apparatus 10, the vehicle 20, and the management apparatus 30 included in the information processing system 1 are primarily described. FIG. 2 is a functional block diagram illustrating schematic configurations of the information processing apparatus 10, the vehicle 20, and the management apparatus 30 of FIG. 1.

As illustrated in FIG. 2, the information processing apparatus 10 includes a communication interface 11, a memory 12, and a controller 13.

The communication interface 11 includes a communication module that connects to the network 40. For example, the communication interface 11 may include a communication module compliant with mobile communication standards such as 4th Generation (4G) and 5th Generation (5G) or with Internet standards. In an embodiment, the information processing apparatus 10 is connected to the network 40 via the communication interface 11. The communication interface 11 transmits and receives various information via the network 40.

The memory 12 is, for example, a semiconductor memory, a magnetic memory, an optical memory, or the like, but is not limited to these. The memory 12 may, for example, function as a main memory, an auxiliary memory, or a cache memory. The memory 12 stores any information used for operations of the information processing apparatus 10. For example, the memory 12 may store a system program, an application program, various types of information received or transmitted by the communication interface 11, and the like. The information stored in the memory 12 may, for example, be updated with information received from the network 40 via the communication interface 11.

The controller 13 includes one or more processors. The "processor" in an embodiment is a general purpose processor or a dedicated processor that is dedicated to specific processing, but the processor is not limited to these. The controller 13 is communicably connected to each component forming the information processing apparatus 10 and controls operations of the information processing apparatus 10 overall.

Next, the configuration of the vehicle 20 included in the information processing system 1 is primarily described. As illustrated in FIG. 2, the vehicle 20 includes a communication interface 21, a memory 22, an acquisition interface 23, an output interface 24, and a controller 25. The communication interface 21, the memory 22, the acquisition interface 23, the output interface 24, and the controller 25 are, for example, communicably connected to each other via an in-vehicle network, such as a controller area network (CAN), or a dedicated line.

The communication interface 21 includes a communication module that connects to the network 40. For example, the communication interface 21 may include a communication module compliant with mobile communication standards such as 4G and 5G. In an embodiment, the vehicle 20 is connected to the network 40 via the communication interface 21. The communication interface 21 transmits and receives various information via the network 40.

The memory 22 is, for example, a semiconductor memory, a magnetic memory, an optical memory, or the like, but is not limited to these. The memory 22 may, for example, function as a main memory, an auxiliary memory, or a cache memory. The memory 22 stores any information used for operations of the vehicle 20. For example, the memory 22 may store a system program, an application program, various types of information received or transmitted by the communication interface 21, and the like. The information stored in the memory 22 may, for example, be updated with information received from the network 40 via the communication interface 21.

The acquisition interface 23 is any module that can acquire information indicating the boarding status of the passengers at the stop. For example, the acquisition interface 23 includes an imaging module configured to image the boarding status of passengers at the stop while the vehicle 20 is stopped at the stop.

The acquisition interface 23 includes one or more receivers compliant with any appropriate satellite positioning system. For example, the acquisition interface 23 may include a Global Positioning System (GPS) receiver. The acquisition interface 23 acquires the measured position of the vehicle 20 as positional information. The positional information includes, for example, an address, latitude, longitude, altitude, and the like. The acquisition interface 23 may acquire the positional information for the vehicle 20 continually, regularly, or non-regularly.

The output interface 24 includes one or more interfaces for output configured to notify passengers waiting at a stop of any appropriate information. For example, the output interface 24 includes digital signage provided on the side surface of the vehicle 20. This example is not limiting, and the output interface 24 may include any appropriate interface for output that stimulates the sense of sight and/or hearing of passengers waiting at the stop while the vehicle 20 is stopped at the stop. The output interface 24 may, for example, include any other image output interface, other than digital signage, that primarily stimulates the sense of sight of passengers waiting at the stop. The output interface 24 may, for example, include any audio output interface, such as a speaker, that primarily stimulates the sense of hearing of passengers waiting at the stop.

The controller 25 includes one or more processors. The "processor" in an embodiment is a general purpose processor or a dedicated processor that is dedicated to specific processing, but the processor is not limited to these. For example, the controller 25 may include an Electronic Control Unit (ECU). The controller 25 is communicably connected to each component forming the vehicle 20 and controls operations of the vehicle 20 overall.

Next, the configuration of the management apparatus 30 included in the information processing system 1 is primarily described. As illustrated in FIG. 2, the management apparatus 30 includes a communication interface 31, a memory 32, an acquisition interface 33, an output interface 34, and a controller 35.

The communication interface 31 includes a communication module that connects to the network 40. For example, the communication interface 31 may include a communication module compliant with mobile communication standards such as 4G and 5G or with Internet standards. In an embodiment, the management apparatus 30 is connected to the network 40 via the communication interface 31. The communication interface 31 transmits and receives various information via the network 40.

The memory 32 is, for example, a semiconductor memory, a magnetic memory, an optical memory, or the like, but is not limited to these. The memory 32 may, for example, function as a main memory, an auxiliary memory, or a cache memory. The memory 32 stores any information used for operations of the management apparatus 30. For example, the memory 32 may store a system program, an application program, various types of information received or transmitted by the communication interface 31, and the like. The information stored in the memory 32 may, for example, be updated with information received from the network 40 via the communication interface 31.

The acquisition interface 33 is any module that can acquire information indicating the boarding status of the passengers at the stop. For example, the acquisition interface 33 includes an imaging module configured to image the boarding status of passengers at the stop where the management apparatus 30 is installed.

The output interface 34 includes one or more interfaces for output configured to notify passengers waiting at a stop of any appropriate information. For example, the output interface 34 includes digital signage provided at the stop. This example is not limiting, and the output interface 34 may include any appropriate interface for output that stimulates the sense of sight and/or hearing of passengers waiting at the stop where the management apparatus 30 is installed. The output interface 34 may, for example, include any other image output interface, other than digital signage, that primarily stimulates the sense of sight of passengers waiting at the stop. The output interface 34 may, for example, include any audio output interface, such as a speaker, that primarily stimulates the sense of hearing of passengers waiting at the stop.

The controller 35 includes one or more processors. The "processor" in an embodiment is a general purpose processor or a dedicated processor that is dedicated to specific processing, but the processor is not limited to these. The controller 35 is communicably connected to each component forming the management apparatus 30 and controls operations of the management apparatus 30 overall.

Figure 3:
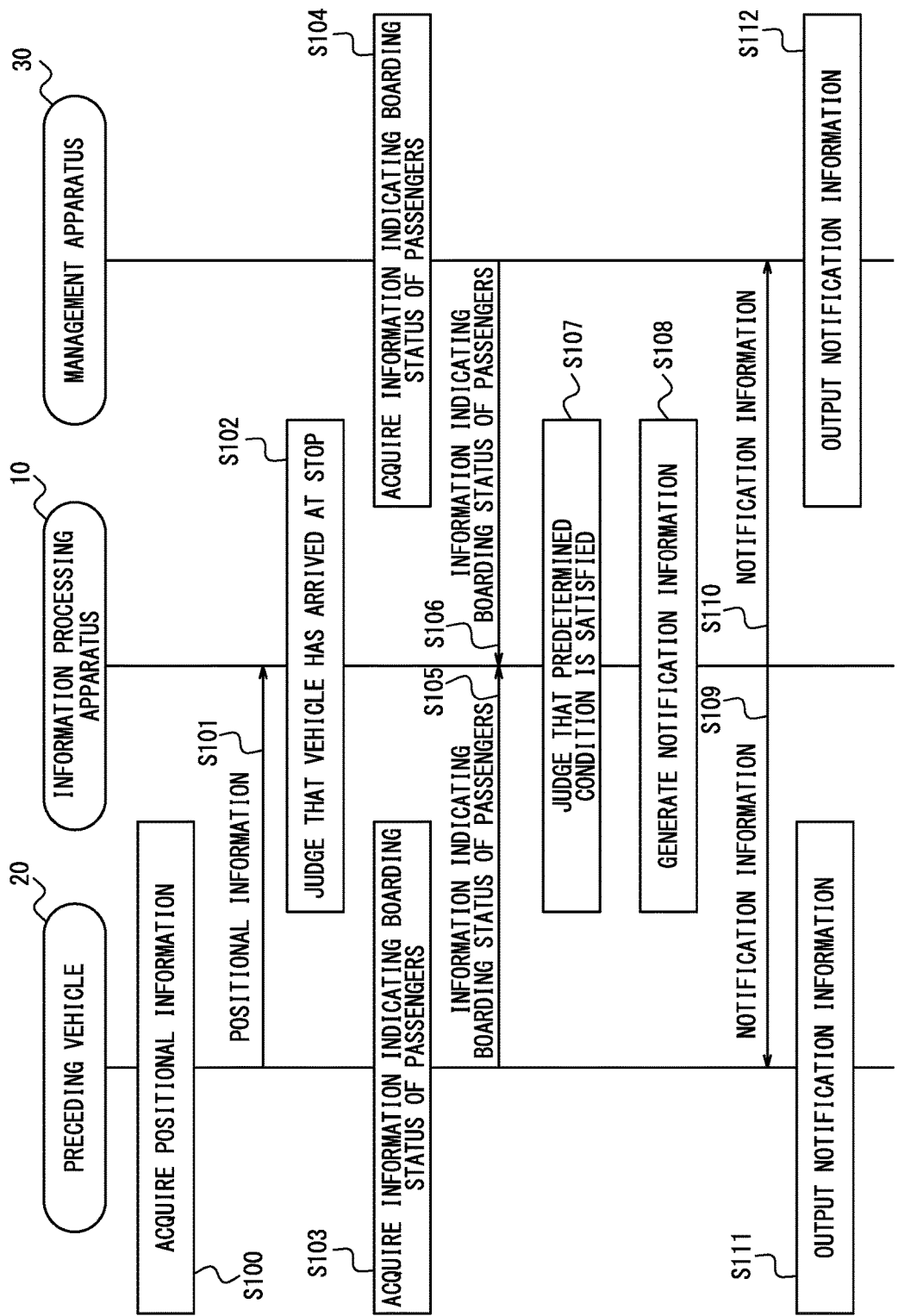
FIG. 3 is a sequence diagram for illustrating an example of an information processing method executed by the information processing system of FIG. 1.

FIG. 3 is a sequence diagram for illustrating an example of an information processing method executed by the information processing system 1 of FIG. 1. With reference to FIG. 3, an example information processing method executed by the information processing system 1 of FIG. 1 is described. The sequence diagram in FIG. 3 illustrates the flow of basic processing of the information processing method executed by the information processing system 1. In FIG. 3, an example is described in which the vehicle 20 is the preceding vehicle 20.

In step S100, the controller 25 of the preceding vehicle 20 acquires positional information for the vehicle 20 using the acquisition interface 23.

In step S101, the controller 25 of the preceding vehicle 20 transmits the positional information acquired in step S100 to the information processing apparatus 10 via the communication interface 21 and the network 40. The controller 13 of the information processing apparatus 10 acquires the positional information for the preceding vehicle 20.

In step S102, the controller 13 of the information processing apparatus 10 judges that the preceding vehicle 20 has arrived at the stop based on the positional information acquired in step S101.

In step S103, the controller 25 of the preceding vehicle 20 acquires information, using the acquisition interface 23, indicating the boarding status of passengers at the stop where the preceding vehicle 20 is stopped. For example, the controller 25 of the preceding vehicle 20 may execute the acquisition process of step S103 in response to a request from the information processing apparatus 10 based on the judgment result in step S102. For example, the controller 25 of the preceding vehicle 20 may execute the acquisition process of step S103 after independently judging that the preceding vehicle 20 has arrived at the stop based on the positional information acquired in step S101.

As in step S103, when the preceding vehicle 20 stops at the stop where the management apparatus 30 is installed, the controller 35 of the management apparatus 30 acquires information, using the acquisition interface 33, indicating the boarding status of passengers at the stop in step S104. For example, the controller 35 of the management apparatus 30 may execute the acquisition process of step S104 in response to a request from the information processing apparatus 10 based on the judgment result in step S102. For example, the controller 35 of the management apparatus 30 may execute the acquisition process of step S104 after independently judging that the preceding vehicle 20 has arrived at the stop based on an image captured by the imaging module of the acquisition interface 33.

In step S105, the controller 25 of the preceding vehicle 20 transmits the information indicating the boarding status of passengers at the stop, acquired in step S103, to the information processing apparatus 10 via the communication interface 21 and the network 40. The controller 13 of the information processing apparatus 10 acquires the information indicating the boarding status of passengers at the stop.

In step S106, the controller 35 of the management apparatus 30 transmits the information indicating the boarding status of passengers at the stop, acquired in step S104, to the information processing apparatus 10 via the communication interface 31 and the network 40. The controller 13 of the information processing apparatus 10 acquires the information indicating the boarding status of passengers at the stop.

In step S107, the controller 13 of the information processing apparatus 10 judges that the boarding status satisfies a predetermined condition based on the acquired information indicating the boarding status of the passengers.

In step S108, the controller 13 of the information processing apparatus 10 generates notification information, based on the judgment result in step S107, to encourage passengers who have not boarded the preceding vehicle 20 to practice distributed boarding onto a subsequent vehicle 20.

In step S109, the controller 13 of the information processing apparatus 10 provides the notification information generated in step S108 to the preceding vehicle 20. For example, the controller 13 of the information processing apparatus 10 transmits the notification information generated in step S108 to the preceding vehicle 20 via the communication interface 11 and the network 40.

In step S110, the controller 13 of the information processing apparatus 10 provides the notification information generated in step S108 to the stop. For example, the controller 13 of the information processing apparatus 10 transmits the notification information generated in step S108 to the management apparatus 30 via the communication interface 11 and the network 40.

In step S111, the controller 25 of the preceding vehicle 20 outputs the notification information, acquired in step S109, using the output interface 24. That is, based on the notification information acquired in step S109, the controller 25 of the preceding vehicle 20 provides a notification to encourage passengers who have not boarded the preceding vehicle 20 to practice distributed boarding onto a subsequent vehicle 20. For example, the controller 25 of the preceding vehicle 20 displays a message on the digital signage of the output interface 24 requesting that the passengers who have not boarded the preceding vehicle 20 practice distributed boarding onto a subsequent vehicle 20. For example, the controller 25 of the preceding vehicle 20 outputs an announcement and/or an alarm from the speaker of the output interface 24 requesting that the passengers who have not boarded the preceding vehicle 20 practice distributed boarding onto a subsequent vehicle 20.

In step S112, the controller 35 of the management apparatus 30 outputs the notification information, acquired in step S110, using the output interface 34. That is, based on the notification information acquired in step S110, the controller 35 of the management apparatus 30 provides a notification to encourage passengers who have not boarded the preceding vehicle 20 to practice distributed boarding onto a subsequent vehicle 20. For example, the controller 35 of the management apparatus 30 displays a message on the digital signage of the output interface 34 requesting that the passengers who have not boarded the preceding vehicle 20 practice distributed boarding onto a subsequent vehicle 20. For example, the controller 35 of the management apparatus 30 outputs an announcement and/or an alarm from the speaker of the output interface 34 requesting that the passengers who have not boarded the preceding vehicle 20 practice distributed boarding onto a subsequent vehicle 20.

Figure 4:
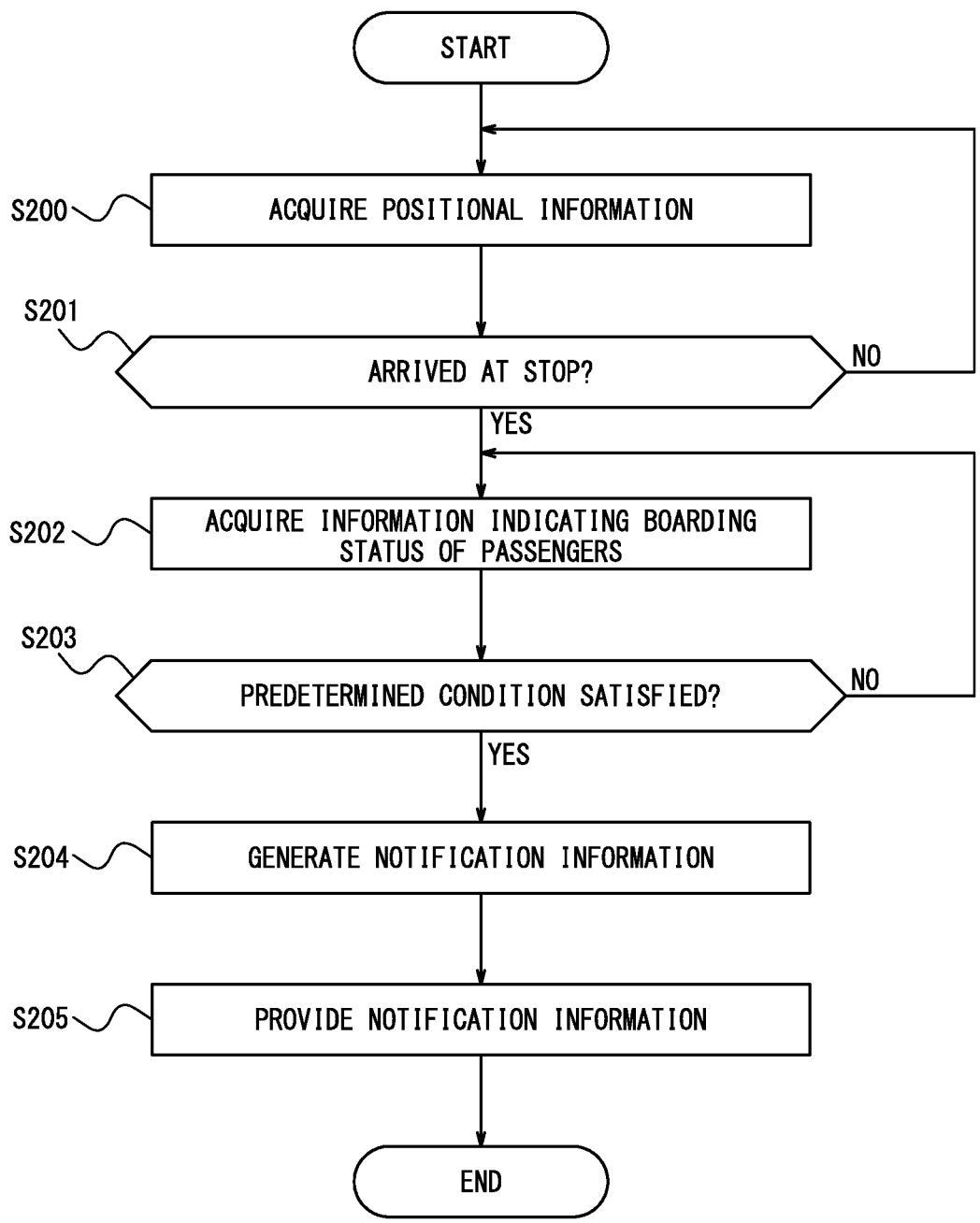
FIG. 4 is a flowchart illustrating a first example of an information processing method executed by the information processing apparatus of FIG. 1.

FIG. 4 is a flowchart illustrating a first example of an information processing method executed by the information processing apparatus 10 of FIG. 1. The flowchart in FIG. 4 illustrates the flow of basic processing of the information processing method executed by the information processing apparatus 10. The flowchart in FIG. 4 illustrates the flow of processing assuming that the preceding vehicle 20 has stopped at a stop and that the departure time specified for the stop has not been reached.

In step S200, the controller 13 of the information processing apparatus 10 acquires the positional information for the preceding vehicle 20. For example, the controller 13 receives the positional information for the preceding vehicle 20 from the preceding vehicle 20 via the network 40 and the communication interface 11.

In step S201, the controller 13 judges whether the preceding vehicle 20 has arrived at the stop. When it is judged that the preceding vehicle 20 has arrived at the stop, the controller 13 executes the process of step S202. When it is judged that the preceding vehicle 20 has not arrived at the stop, the controller 13 executes the process of step S200 again.

When it is judged that the preceding vehicle 20 has arrived at the stop in step S201, the controller 13 acquires information indicating the boarding status of passengers at the stop in step S202. For example, the controller 13 receives information indicating the boarding status of passengers from the preceding vehicle 20 and/or the management apparatus 30 via the network 40 and the communication interface 11.

In step S203, the controller 13 judges whether the boarding status satisfies a predetermined condition based on the information, acquired in step S202, indicating the boarding status of the passengers. When it is judged that the boarding status satisfies the predetermined condition, the controller 13 executes the process of step S204. When it is judged that the boarding status does not satisfy the predetermined condition, the controller 13 executes the process of step S202 again.

When it is judged in step S203 that the boarding status satisfies a predetermined condition, the controller 13 generates notification information in step S204 to encourage passengers not boarded onto the preceding vehicle 20 to practice distributed boarding onto a subsequent vehicle 20. For example, the controller 13 may generate notification information to be outputted via the digital signage installed on the preceding vehicle 20 and/or the stop.

In step S205, the controller 13 provides the notification information generated in step S204 to the preceding vehicle 20 and/or the stop. For example, the controller 13 transmits the notification information generated in step S204 to the preceding vehicle 20 and/or the management apparatus 30 via the communication interface 11 and the network 40.

Figure 5:
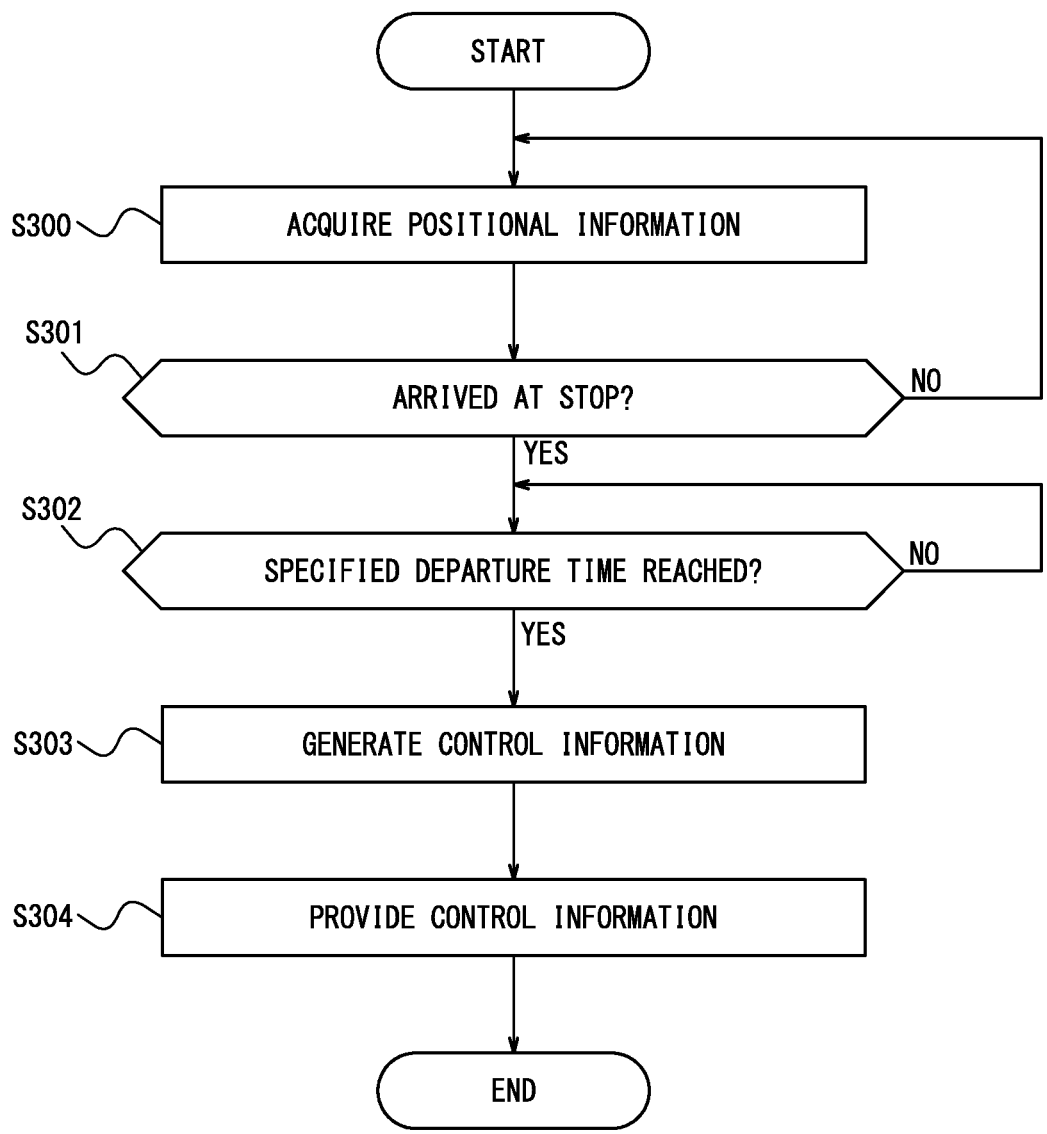
FIG. 5 is a flowchart illustrating a second example of an information processing method executed by the information processing apparatus of FIG. 1.

FIG. 5 is a flowchart illustrating a second example of an information processing method executed by the information processing apparatus 10 of FIG. 1. The flowchart in FIG. 5 illustrates the flow of processing mainly assuming that after the preceding vehicle 20 has stopped at a stop, the departure time specified for the stop has been reached.

In step S300, the controller 13 of the information processing apparatus 10 acquires the positional information for the preceding vehicle 20. For example, the controller 13 receives the positional information for the preceding vehicle 20 from the preceding vehicle 20 via the network 40 and the communication interface 11.

In step S301, the controller 13 judges whether the preceding vehicle 20 has arrived at the stop. When it is judged that the preceding vehicle 20 has arrived at the stop, the controller 13 executes the process of step S302. When it is judged that the preceding vehicle 20 has not arrived at the stop, the controller 13 executes the process of step S300 again.

When it is judged in step S301 that the preceding vehicle 20 has arrived at the stop, the controller 13 judges in step S302 whether the specified departure time at the stop has been reached. When it is judged that the specified departure time has been reached, the controller 13 executes the process of step S303. When it is judged that the specified departure time has not been reached, the controller 13 executes the process of step S302 again.

When it is judged that the specified departure time has been reached in step S302, the controller 13 generates control information in step S303 prompting the departure of the preceding vehicle 20. In the present disclosure, "control information" includes, for example, information for controlling the travel status of the vehicle 20 that drives autonomously. For example, the control information includes operation information on the accelerator, the brakes, the steering, and the like of the vehicle 20 that drives autonomously. These examples are not limiting, and the control information may include information for controlling a notification process, performed by a vehicle 20 driven by a driver, to notify the driver in the vehicle 20.

In step S304, the controller 13 provides the notification information generated in step S303 to the preceding vehicle 20. For example, the controller 13 transmits the notification information generated in step S303 to the preceding vehicle 20 via the communication interface 11 and the network 40.

The preceding vehicle 20 executes autonomous driving to depart from the stop based on the control information acquired in step S304. This example is not limiting, and the preceding vehicle 20 may provide a notification prompting the driver to depart from the stop based on the control information acquired in step S304.

FIG. 6 is a diagram for illustrating an example of processing by the controller 13 of the information processing apparatus 10 of FIG. 2. With reference to FIG. 6, a process executed by the controller 13 to judge whether the boarding status satisfies a predetermined condition is mainly described. Although specific examples are provided for four preceding vehicles 20 in FIG. 6, the number of preceding vehicles 20 included in the information processing system 1 is not limited to four.

When it is judged that a preceding vehicle C1 has arrived at the stop S1, the controller 13 acquires information indicating the boarding status of passengers at the stop S1. The controller 13 judges whether the boarding status satisfies a first predetermined condition based on the acquired information. For example, the controller 13 judges whether the boarding status satisfies the condition that the rate of decrease of passengers who have not boarded at the stop S1 is less than the first threshold. The controller 13 generates notification information when it is judged that the boarding status at the stop S1 satisfies the first condition, and encourages passengers not boarded onto the preceding vehicle C1 at the stop S1 to practice distributed boarding onto a subsequent vehicle 20.

When it is judged that a preceding vehicle C2 has arrived at the stop S2, the controller 13 acquires information indicating the boarding status of passengers at the stop S2. The controller 13 judges whether the boarding status satisfies a second predetermined condition based on the acquired information. For example, the controller 13 judges whether the boarding status satisfies the condition that the number of passengers who have not boarded by a specified time before the departure time at the stop S2 is greater than the second threshold. The controller 13 generates notification information when it is judged that the boarding status at the stop S2 satisfies the second condition, and encourages passengers not boarded onto the preceding vehicle C2 at the stop S2 to practice distributed boarding onto a subsequent vehicle 20.

When it is judged that a preceding vehicle C3 has arrived at the stop S3, the controller 13 acquires information indicating the boarding status of passengers at the stop S3. The controller 13 judges whether the boarding status satisfies a second predetermined condition based on the acquired information. For example, the controller 13 judges whether the boarding status satisfies the condition that there is at least one passenger who has not boarded when the departure time at the stop S3 is reached. The controller 13 generates notification information when it is judged that the boarding status at the stop S3 satisfies the third condition, and encourages passengers not boarded onto the preceding vehicle C3 at the stop S3 to practice distributed boarding onto a subsequent vehicle 20.

When it is judged that a preceding vehicle C4 has arrived at the stop S4, the controller 13 acquires information indicating the boarding status of passengers at the stop S4. The controller 13 judges whether the boarding status satisfies a fourth predetermined condition based on the acquired information. For example, the controller 13 judges whether the boarding status satisfies the condition that the number of passengers having a predetermined attribute among the passengers who have not boarded at the stop S4 is greater than a third threshold. The controller 13 generates notification information when it is judged that the boarding status at the stop S4 satisfies the fourth condition, and encourages passengers not boarded onto the preceding vehicle C4 at the stop S4 to practice distributed boarding onto a subsequent vehicle 20.

According to above embodiment, distributed boarding onto a subsequent vehicle 20 can more flexibility be encouraged in accordance with the boarding status of passengers at a stop. For example, the information processing apparatus 10 provides notification information, based on the result of judging whether the boarding status satisfies a predetermined condition, to the preceding vehicle 20 and/or the stop. This allows the information processing apparatus 10 to more flexibly encourage distributed boarding onto a subsequent vehicle 20 based on the boarding status of passengers at the stop, regardless of whether the preceding vehicle 20 is full. Consequently, disruption of the operation schedule of the vehicle 20 is avoided.

The predetermined condition includes the first condition that the rate of decrease of passengers who have not boarded at the stop is less than a first threshold. In this way, the information processing apparatus 10 can accurately judge whether the boarding status satisfies the predetermined condition based on the ratio of decrease of passengers who have not boarded at the stop. The information processing apparatus 10 can accurately judge whether boarding of passengers on the preceding vehicle 20 is delayed based on an objective indicator, i.e. the rate of decrease of passengers who have not boarded at the stop. In other words, the information processing apparatus 10 can accurately judge whether boarding of passengers on the preceding vehicle 20 is proceeding smoothly based on this objective indicator.

The predetermined condition includes the second condition that the number of passengers who have not boarded by a specified time before the departure time at the stop is greater than a second threshold. In this way, the information processing apparatus 10 can accurately judge whether the boarding status satisfies the predetermined condition based on the number of passengers who have not boarded by a specified time before the departure time. The information processing apparatus 10 can accurately judge whether boarding of passengers on the preceding vehicle 20 is delayed based on an objective indicator, i.e. the number of passengers who have not boarded by a specified time before the departure time. In other words, the information processing apparatus 10 can accurately judge whether boarding of passengers on the preceding vehicle 20 is proceeding smoothly based on this objective indicator.

The predetermined condition includes the third condition that there is at least one passenger who has not boarded when the departure time at the stop is reached. In this way, the information processing apparatus 10 can accurately judge whether the boarding status satisfies the predetermined condition based on the number of passengers who have not boarded when the departure time is reached. The information processing apparatus 10 can accurately judge whether boarding of passengers on the preceding vehicle 20 is delayed based on an objective indicator, i.e. the number of passengers who have not boarded when the departure time is reached. In other words, the information processing apparatus 10 can accurately judge whether boarding of passengers on the preceding vehicle 20 is proceeding smoothly based on this objective indicator.

The predetermined condition includes the fourth condition that the number of passengers having a predetermined attribute among the passengers who have not boarded at the stop is greater than a third threshold. In this way, the information processing apparatus 10 can accurately judge whether the boarding status satisfies the predetermined condition based on the number of passengers having a predetermined attribute among the passengers who have not boarded at the stop. The information processing apparatus 10 can accurately judge whether boarding of passengers on the preceding vehicle 20 is delayed based on an objective indicator, i.e. the number of passengers having a predetermined attribute among the passengers who have not boarded at the stop. In other words, the information processing apparatus 10 can accurately judge whether boarding of passengers on the preceding vehicle 20 is proceeding smoothly based on this objective indicator.

The information processing apparatus 10 generates notification information to be outputted via the digital signage installed on the preceding vehicle 20 and/or the stop. For example, the controller 25 of the preceding vehicle 20 that has acquired this notification information can display a message on the digital signage of the output interface 24 requesting that the passengers who have not boarded the preceding vehicle 20 practice distributed boarding onto a subsequent vehicle 20. For example, the controller 35 of the management apparatus 30 that has acquired this notification information can display a message on the digital signage of the output interface 34 requesting that the passengers who have not boarded the preceding vehicle 20 practice distributed boarding onto a subsequent vehicle 20. In this way, the passengers about to board the preceding vehicle 20 at the stop can visually confirm the message that requests distributed boarding onto a subsequent vehicle 20.

When it is judged that the specified departure time at the stop has been reached, the information processing apparatus 10 generates control information prompting the departure of the preceding vehicle 20. In this way, the preceding vehicle 20 can accurately depart the stop at the specified departure time for the stop. Consequently, disruption of the operation schedule of the vehicle 20 is avoided.

While the present disclosure has been described based on the drawings and examples, it should be noted that various changes and modifications may be made by those skilled in the art based on the present disclosure. Accordingly, such modifications and revisions are included within the scope of the present disclosure. For example, the functions and the like included in each component, step, or the like can be rearranged in a logically consistent manner. A plurality of components, steps, or the like may be combined into one, or a single component, step, or the like may be divided.

For example, at least some of the processing operations performed in the information processing apparatus 10 in the above-described embodiment may be performed in the vehicle 20 or the management apparatus 30. For example, instead of the information processing apparatus 10, the vehicle 20 itself may perform the processing operations described above with respect to the information processing apparatus 10. At least some of the processing operations performed in the vehicle 20 or the management apparatus 30 may be performed in the information processing apparatus 10.

For example, a general purpose electronic device, such as a smartphone or a computer, can also be configured to function as the information processing apparatus 10 according to the above-described embodiment. Specifically, a program describing the processing content for realizing the functions of the information processing apparatus 10 and the like according to the embodiment is stored in a memory of the electronic device, and the program is read and executed by the processor of the electronic device. Accordingly, the present disclosure can also be embodied as a program executable by a processor.

Alternatively, an embodiment of the present disclosure may be implemented as a non-transitory computer readable medium that stores a program executable by one or more processors to cause the information processing apparatus 10 according to the embodiment or the like to perform the various functions. It is to be understood that these embodiments are also included within the scope of the present disclosure.

For example, the information processing apparatus 10 in the above-described embodiment may be mounted in the vehicle 20. At this time, the information processing apparatus 10 may communicate information directly with the vehicle 20 without passing through the network 40.

In the above embodiment, the information processing apparatus 10 has been described as acquiring information indicating the boarding status of passengers at the stop from both the preceding vehicle 20 and the management apparatus 30, but this example is not limiting. The information processing apparatus 10 may acquire information indicating the boarding status of passengers at the stop from just one of the preceding vehicle 20 and the management apparatus 30. Consequently, just one of the preceding vehicle 20 and the management apparatus 30 may acquire information indicating the boarding status of passengers at the stop using the corresponding acquisition interface.

In the above embodiment, the information processing apparatus 10 has been described as providing the generated notification information to both the preceding vehicle 20 and the stop, but this example is not limiting. The information processing apparatus 10 may provide the generated notification information to just one of the preceding vehicle 20 and the stop. Consequently, just one of the preceding vehicle 20 and the management apparatus 30 may output the acquired notification information using the corresponding output interface.

In the above embodiment, the information processing apparatus 10 has been described as generating notification information to be outputted via the digital signage installed on the preceding vehicle 20 and/or the stop, but this example is not limiting. Instead of or in addition to such visual information, the information processing apparatus 10 may generate notification information to be outputted by any appropriate audio output interface, such as a speaker, installed in the preceding vehicle 20 and/or the stop.

In the above embodiment, the information processing apparatus 10 has been described as generating control information prompting the departure of the preceding vehicle 20 when it is judged that the specified departure time at the stop has been reached, but this example is not limiting. The information processing apparatus 10 need not generate such control information.

In the above embodiment, the subsequent vehicle 20 may be caught up to the preceding vehicle 20 that is stopped at the stop or may be traveling behind the preceding vehicle 20 at a position that is a predetermined distance away from the stop.

The invention claimed is:

1. An information processing apparatus for prompting passengers to practice distributed boarding onto vehicles, the information processing apparatus comprising:
    a processor; and
    a memory;
    wherein the processor is configured to acquire image information indicating a boarding status of passengers outside a preceding vehicle at a stop when it is judged that the preceding vehicle has arrived at the stop and cause a display to display notification information to prompt passengers who have not boarded the preceding vehicle to practice distributed boarding, even in the case that the preceding vehicle is not full, onto a subsequent vehicle when it is judged that the boarding status satisfies a predetermined condition based on the acquired image information, and the predetermined condition includes a first condition that a rate of decrease of passengers who have not boarded at the stop is less than a first threshold.

2. The information processing apparatus of claim 1, wherein the predetermined condition includes a second condition that the number of passengers who have not boarded by a specified time before a departure time at the stop is greater than a second threshold.

3. The information processing apparatus of claim 1, wherein the predetermined condition includes a third condition that there is at least one passenger who has not boarded when a departure time at the stop is reached.

4. The information processing apparatus of claim 1, wherein the predetermined condition includes a fourth condition that the number of passengers having a predetermined attribute among passengers who have not boarded at the stop is greater than a third threshold.

5. The information processing apparatus of claim 1, wherein the processor is configured to generate the notification information to be outputted via digital signage installed on the preceding vehicle and/or the stop.

6. The information processing apparatus of claim 1, wherein the processor is configured to generate control information prompting departure of the preceding vehicle when it is judged that a specified departure time at the stop has been reached.

7. An information processing system comprising:
    the information processing apparatus of claim 1;
    the vehicle configured to stop at the stop; and
    a management apparatus installed at the stop where the vehicle stops.

8. A non-transitory computer readable medium storing a program executable by one or more processors and configured to cause an information processing apparatus, for prompting passengers to practice distributed boarding onto vehicles, to execute functions comprising:
    judging whether a preceding vehicle has arrived at a stop;
    acquiring image information indicating a boarding status of passengers outside the preceding vehicle at the stop when it is judged that the preceding vehicle has arrived at the stop;

causing a display to display notification information to prompt passengers who have not boarded the preceding vehicle to practice distributed boarding, even in the case that the preceding vehicle is not full, onto a subsequent vehicle when it is judged that the boarding status satisfies a predetermined condition based on the acquired image information, and the predetermined condition includes a first condition that a rate of decrease of passengers who have not boarded at the stop is less than a first threshold.

9. The non-transitory computer readable medium of claim 8, wherein the predetermined condition includes a second condition that the number of passengers who have not boarded by a specified time before a departure time at the stop is greater than a second threshold.

10. The non-transitory computer readable medium of claim 8, wherein the predetermined condition includes a third condition that there is at least one passenger who has not boarded when a departure time at the stop is reached.

11. The non-transitory computer readable medium of claim 8, wherein the predetermined condition includes a fourth condition that the number of passengers having a predetermined attribute among passengers who have not boarded at the stop is greater than a third threshold.

12. The non-transitory computer readable medium of claim 9, wherein the notification information is generated so as to be outputted via digital signage installed on the preceding vehicle and/or the stop.

13. A vehicle for prompting passengers to practice distributed boarding onto the vehicle, the vehicle comprising a controller configured to:

acquire image information indicating a boarding status of passengers outside the vehicle at a stop when it is judged that the vehicle has arrived at the stop and cause a display to provide, via the vehicle and/or the stop, a notification to prompt passengers who have not boarded the vehicle to practice distributed boarding, even if the vehicle is not full, onto a subsequent vehicle when it is judged that the boarding status satisfies a predetermined condition based on the acquired information, and the predetermined condition includes a first condition that a rate of decrease of passengers who have not boarded at the stop is less than a first threshold.

14. The vehicle of claim 13, wherein the predetermined condition includes a second condition that the number of passengers who have not boarded by a specified time before a departure time at the stop is greater than a second threshold.

15. The vehicle of claim 13, wherein the predetermined condition includes a third condition that there is at least one passenger who has not boarded when a departure time at the stop is reached.

16. The vehicle of claim 13, wherein the predetermined condition includes a fourth condition that the number of passengers having a predetermined attribute among passengers who have not boarded at the stop is greater than a third threshold.

17. The vehicle of claim 13, wherein the controller is configured to provide the notification via digital signage installed on the vehicle and/or the stop.

* * * * *